(12) United States Patent
Moore

(10) Patent No.: US 7,018,143 B2
(45) Date of Patent: Mar. 28, 2006

(54) REDUCED ENERGY CONSUMING, LATERAL CUTTING TWIST DRILL

(75) Inventor: Richard A. Moore, Newport, OR (US)

(73) Assignee: Bitmoore, an Oregon General Partnership, Salem, OR (US)

( * ) Notice: Subject to any disclaimer, the term of this patent is extended or adjusted under 35 U.S.C. 154(b) by 202 days.

(21) Appl. No.: 10/227,603

(22) Filed: Aug. 23, 2002

(65) Prior Publication Data

US 2003/0053874 A1 Mar. 20, 2003

Related U.S. Application Data

(60) Continuation-in-part of application No. 10/007,005, filed on Nov. 9, 2001, now abandoned, which is a division of application No. 09/174,887, filed on Oct. 19, 1998, now Pat. No. 6,315,505, which is a division of application No. 08/698,722, filed on Aug. 15, 1996, now Pat. No. 5,823,720.

(60) Provisional application No. 60/314,625, filed on Aug. 23, 2001.

(51) Int. Cl.
*B23B 51/02* (2006.01)
(52) U.S. Cl. .............. 408/230; 408/211; 408/224
(58) Field of Classification Search ......... 408/22, 408/24, 30, 211, 223, 224, 227, 230
See application file for complete search history.

(56) References Cited

U.S. PATENT DOCUMENTS

| 3,564,948 | A | | 2/1971 | Pomernacki | 77/70 |
|---|---|---|---|---|---|
| 5,184,926 | A | * | 2/1993 | Hemmings | 408/226 |
| 5,186,584 | A | | 2/1993 | Müller et al. | 408/26 |
| 5,855,458 | A | | 1/1999 | Reynolds et al. | 407/54 |
| 5,967,712 | A | * | 10/1999 | Magill et al. | 408/227 |
| 6,007,281 | A | * | 12/1999 | Eriksson et al. | 409/132 |
| 6,126,367 | A | * | 10/2000 | Reed | 408/1 R |
| 6,200,078 | B1 | * | 3/2001 | Kubota | 409/74 |
| 6,315,505 | B1 | * | 11/2001 | Moore | 408/199 |
| 6,431,801 | B1 | * | 8/2002 | Vasudeva et al. | 408/211 |
| 2003/0185640 | A1 | * | 10/2003 | Ito | 408/230 |
| 2004/0042859 | A1 | * | 3/2004 | Edvardsson et al. | 408/230 |

FOREIGN PATENT DOCUMENTS

| DE | 3527933 | * | 10/1986 |
|---|---|---|---|
| FR | 2407044 | * | 5/1979 |
| JP | 63-185507 | * | 8/1988 |
| JP | 63-260713 | * | 10/1988 |
| JP | 1-140910 | * | 6/1989 |
| JP | 1-146606 | * | 6/1989 |

* cited by examiner

*Primary Examiner*—Daniel W. Howell
(74) *Attorney, Agent, or Firm*—Stoel Rives LLP

(57) ABSTRACT

A modified prior art twist drill embodies structural features that require less energy to drill a hole during a normal plunge operation and allow for lateral cutting movement during extraction of the twist drill from a drilled work piece.

12 Claims, 5 Drawing Sheets

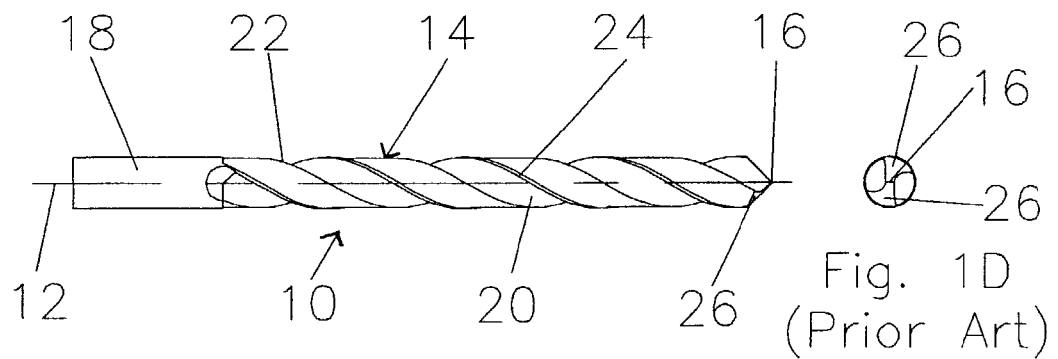
Fig. 1A (Prior Art)
Fig. 1D (Prior Art)
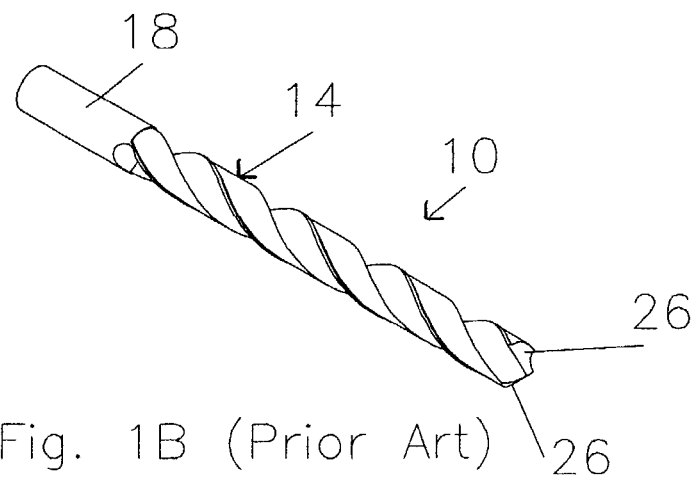
Fig. 1B (Prior Art)
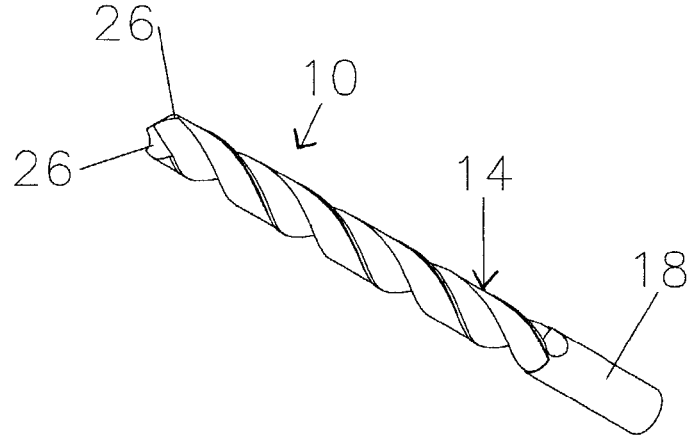
Fig. 1C (Prior Art)

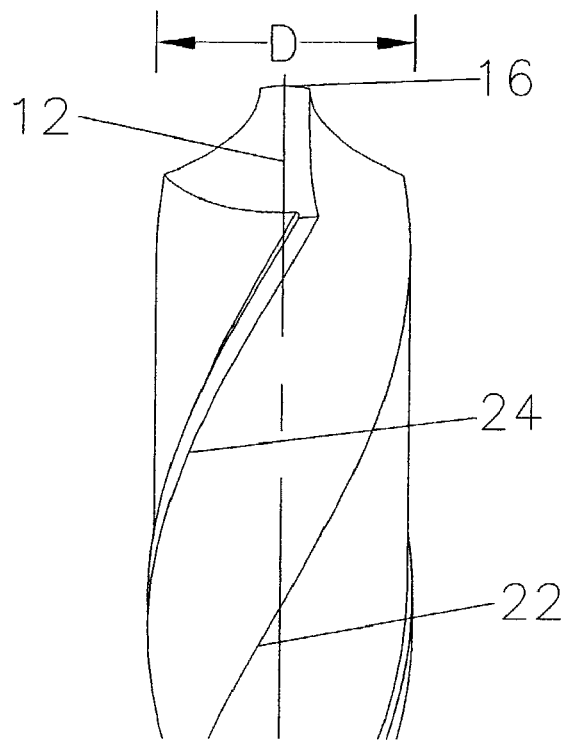
Fig. 2D (Prior Art)
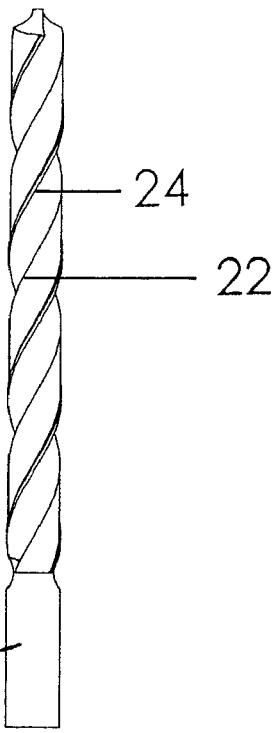
Fig. 2A (Prior Art)  Fig. 2B (Prior Art)  Fig. 2C (Prior Art)

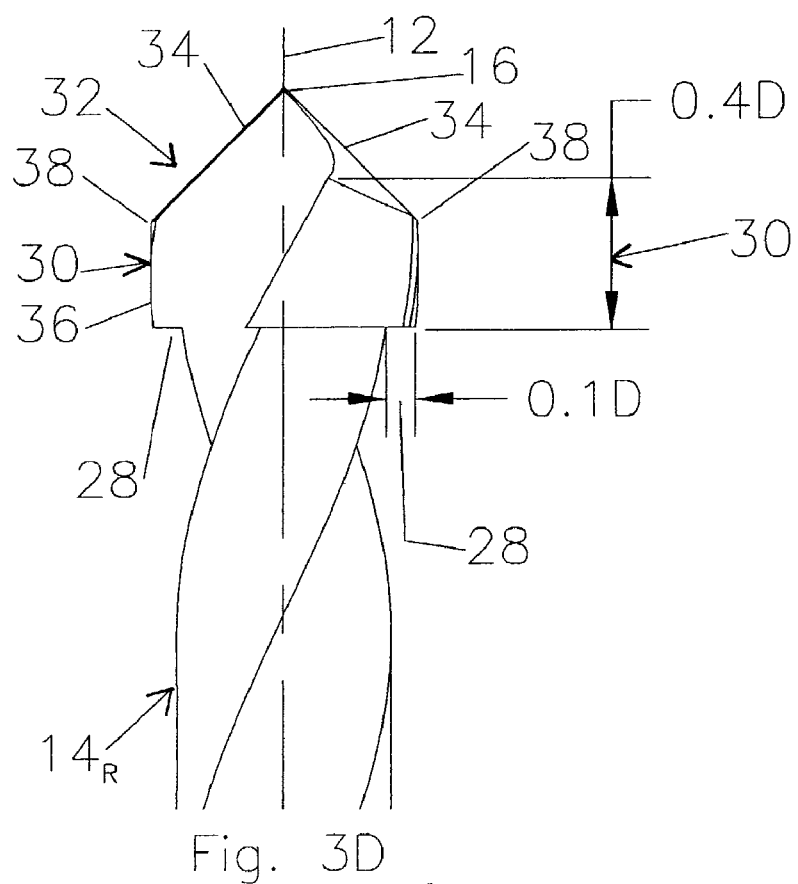
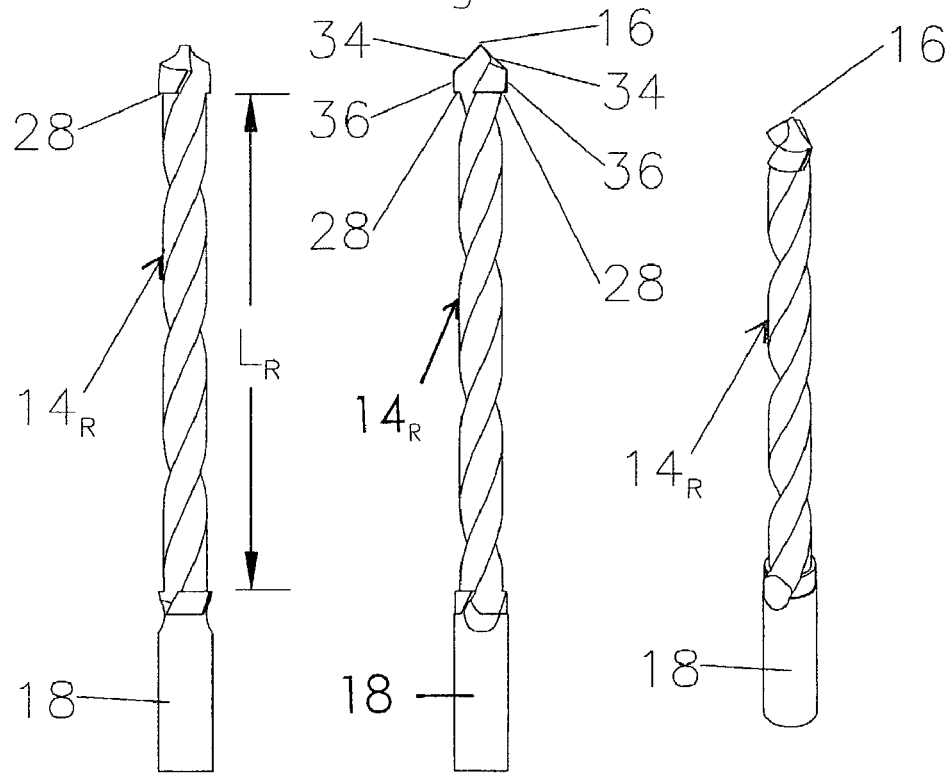
Fig. 3D
Fig. 3A  Fig. 3B  Fig. 3C

REDUCED ENERGY CONSUMING, LATERAL CUTTING TWIST DRILL

RELATED APPLICATIONS

This application claims benefit of U.S. Provisional Patent Application No. 60/314,625, filed Aug. 23, 2001, and is a continuation-in-part of Application No. 10/007,005, filed Nov. 9, 2001, abandoned, which is a division of Application No. 09/174,887, filed Oct. 19, 1998, now U.S. Pat. No. 6,315,505, which is a division of Application No. 08/698,722, filed Aug. 15, 1996, now U.S. Pat. No. 5,823,720.

TECHNICAL FIELD

This invention provides in a conventional twist drill or "jobber bit" structural features that require less energy to drill a hole during a normal plunge operation and allow for lateral cutting movement during extraction from a drilled work piece.

BACKGROUND OF THE INVENTION

FIGS. 1A, 1B, and 1C are three side elevation views and FIG. 1D is a work end view of a conventional twist drill 10. The three side elevation views of FIGS. 1A, 1B, and 1C show twist drill 10 in different angular orientations of and about its longitudinal axis 12 to clearly present certain structural features. Specifically, twist drill 10 has a body that includes an elongated shaft 14 extending between a tip 16 and a shank 18. Each of a pair of flutes 20 spirals along the length of shaft 14 and has a trailing edge 22 and a sharpened leading cutting edge 24. Two top relief portions 26 provide at a work end downwardly sloping surfaces that form a taper from tip 16 to the full diameter of shaft 14.

FIGS. 2A, 2B, and 2C show twist drill 10 in, respectively, a reference (substantially 0 degrees) angular orientation about longitudinal axis 12, a 90 degree angularly displaced orientation about longitudinal axis 12 relative to that of FIG. 2A, and the orientation of FIG. 2B with an outwardly directed tilt from the plane of the figure. FIG. 2D is an enlarged fragmentary view of the work end of twist drill 10 in the angular orientation shown in FIG. 2A. Increasing amounts of the lengths of trailing edge 22 and leading cutting edge 24 of shaft 14 contact the wall of a hole cut by twist drill 10 as it plunges into a work piece (not shown). The contact of shaft 14 against the hole wall creates friction between twist drill 10 and the work piece. This friction generates heat stored in twist drill 10 and necessitates energy to overcome drag slowing the rate of plunge of twist drill bit 10 into the work piece. Moreover, twist drill 10 is not configured to accommodate lateral cutting movement in a drilled hole to facilitate correction of axial misalignment of holes in two work pieces positioned to be joined by a fastener inserted in them.

What is needed, therefore, is a twist drill bit configured to reduce the amount of friction produced and thereby reduce the amounts of heat generated and energy consumed during cutting a hole into a work piece. Reducing energy consumption would be especially beneficial in the operation of a twist drill held in a cordless (i.e., battery operated) drill power head.

SUMMARY OF THE INVENTION

The present invention provides in a prior art twist drill structural features that require less energy to drill a hole during a normal plunge operation and allow for lateral cutting movement during extraction of the twist drill from a drilled work piece. In a first embodiment, reduced friction is accomplished by provision of a depthwise recess along the length of the shaft between the tapered end and the shank of the twist drill. The recess establishes a transition portion between the tapered end and the shank and thereby determines at the tapered end the lengths of cutting edges angularly inclined from the tip in directions away from the longitudinal axis. The terminations of the inclined cutting edges at the transition portion defines the wall diameter of the hole cut by the twist drill. In a second embodiment, a leading edge tooth formed in the transition portion enables lateral cutting movement during extraction of the twist drill from the work piece.

Additional objects and advantages of this invention will be made apparent from the following detailed description of preferred embodiments thereof, which proceeds with reference to the accompanying drawings.

BRIEF DESCRIPTION OF THE DRAWINGS

FIGS. 1A, 1B, and 1C are side elevation views and FIG. 1D is a plan view of the work end of a conventional twist drill.

FIG. 2A and 2B are side elevation views in different angular orientations of the prior art twist drill of FIGS. 1A–1D; FIG. 2C is a view of the twist drill of FIG. 2B with an outwardly directed tilt from the plane of the figure; and FIG. 2D is an enlarged, fragmentary side elevation view of the work end of the twist drill of FIG. 2A.

FIGS. 3A, 3B, and 3C correspond to, respectively, the views of FIGS. 2A, 2B, and 2C and show a first embodiment of the invention with a depthwise recess formed in and along the length of the shaft of the twist drill; and FIG. 3D is an enlarged, fragmentary view of the work end of the twist drill of FIG. 3B.

DETAILED DESCRIPTION OF PREFERRED EMBODIMENTS

Figures 4A, 4B, 4C, 4D:
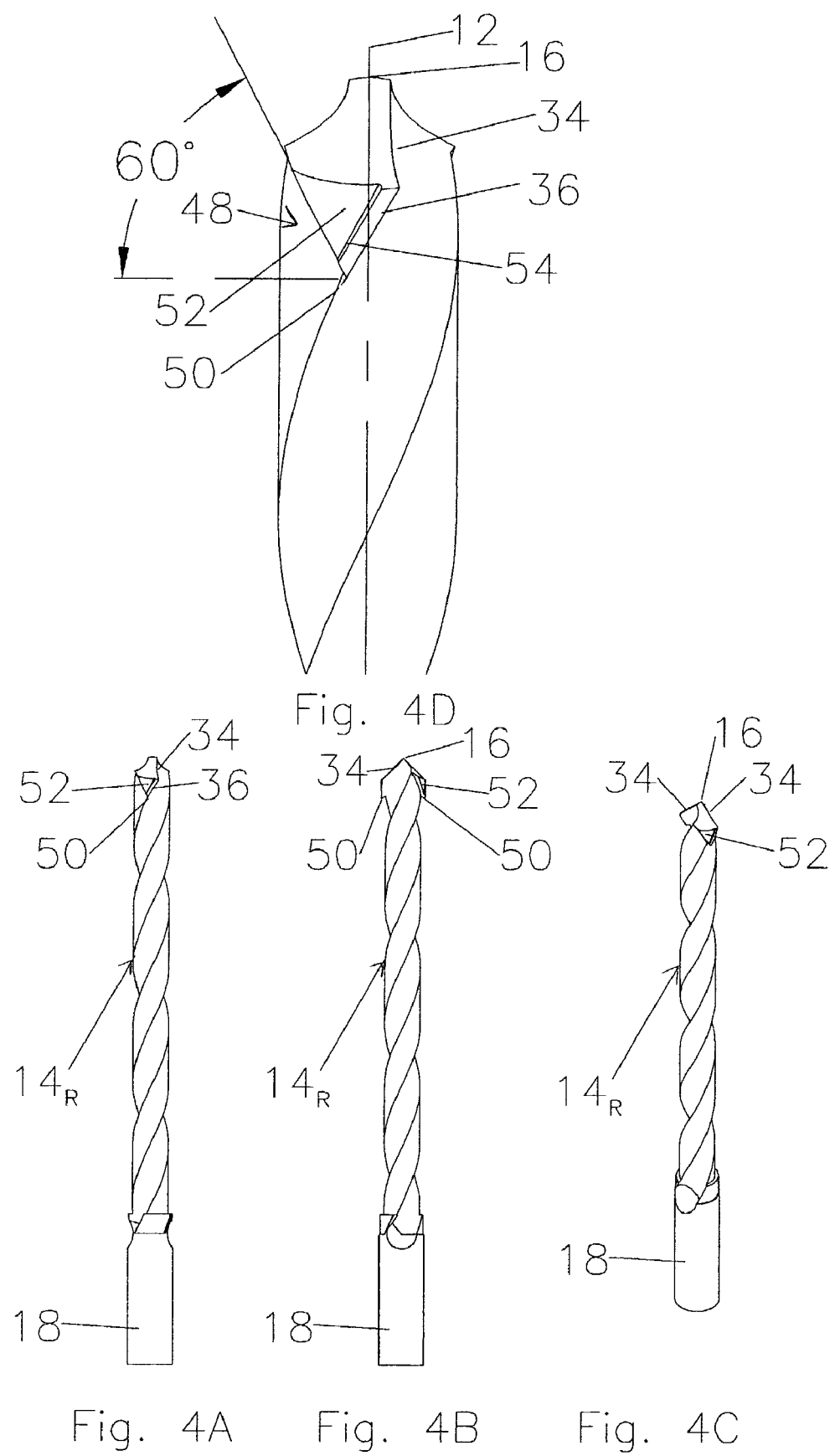
FIGS. 4A, 4B, and 4C correspond to, respectively, the views of FIGS. 2A, 2B, and 2C and show a second embodiment of the invention formed with the depthwise recess in the shaft, and a leading edge tooth to enable lateral cutting upon extraction, of the twist drill.
FIG. 4D is an enlarged, fragmentary view of the work end of the twist drill of FIG. 4A.
Figures 5A, 5B, 5C, 5D, 5E:
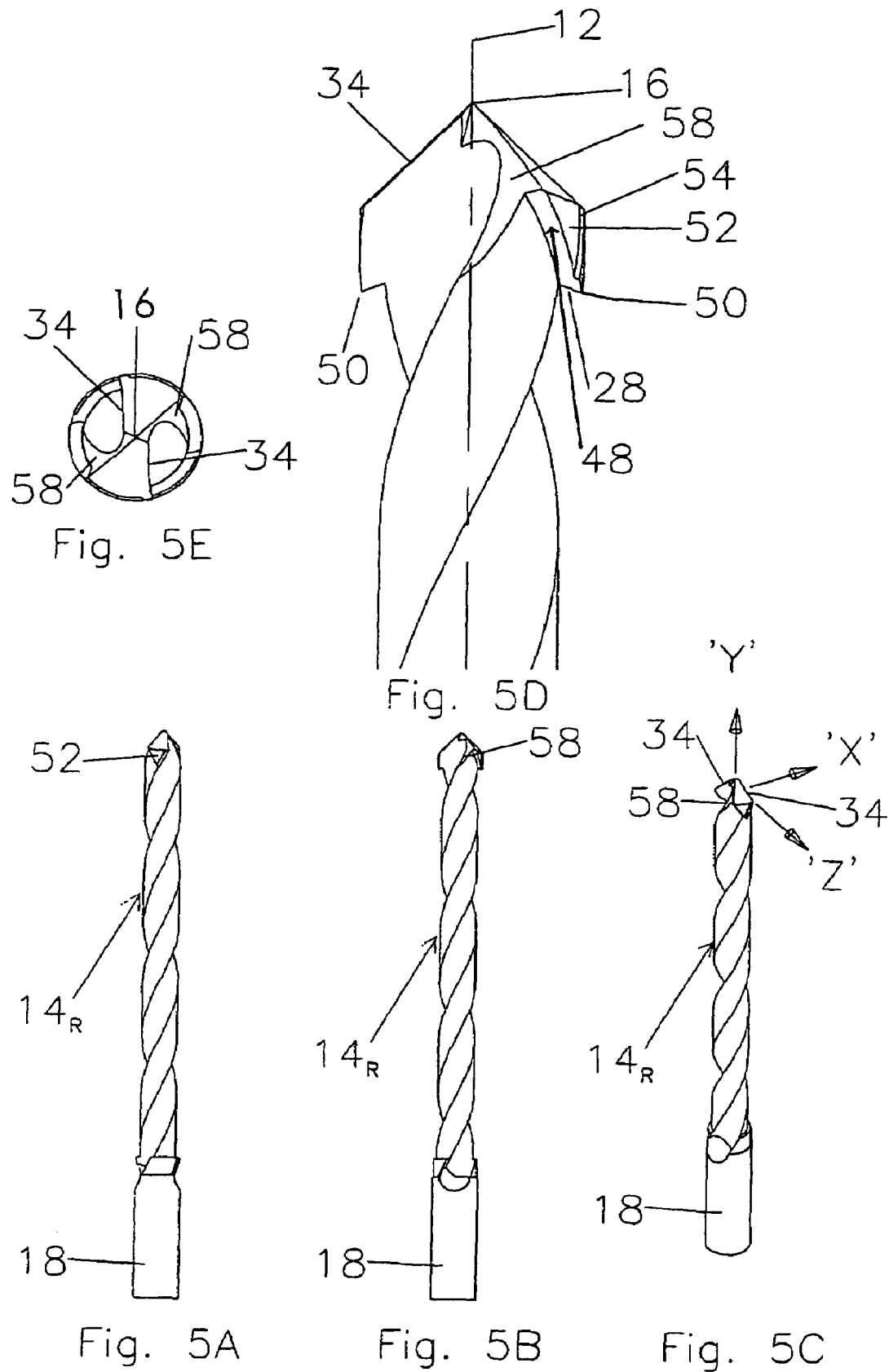
FIGS. 5A, 5B, and 5C correspond to, respectively, the views of FIGS. 4A, 4B, and 4C and show the second embodiment of the invention formed with an optional top relief region that creates a clearance path for material removed by the twist drill operating in its reverse direction.
FIG. 5D is an enlarged, fragmentary view of the work end of the twist drill of FIG. 5B.
FIG. 5E is a plan view of the work end of FIG. 5A.

FIGS. 3A, 3B, and 3C; FIGS. 4A, 4B, and 4C; and FIGS. 5A, 5B, and 5C show corresponding angular orientations of twist drill 10 undergoing in three process steps modifications that form the relieved reversible twist drill of the invention. The drawing figures are identified by alphanumeric figure numbers. The numerals 3, 4, and 5 indicate different modification process steps, and common letter suffices of the numerals 2, 3, 4, and 5 indicate the same angular orientation about longitudinal axis 12 of twist drill 10 undergoing modification to form the present invention.

FIGS. 3A, 3B, and 3C show that a first modification process step entails imparting, such as by grinding, to shaft 14 a cylindrical relief 28 of 0.1D in depth along the length of shaft 14 to within 0.4D of the cutting edge, where "D" represents the diameter of the hole (see FIG. 2) cut by the twist drill. FIG. 3D, which is a 5:1 enlarged view of the work end shown in FIG. 3B, shows the dimensions 0.1D and 0.4D that pertain to this first modification process step. FIG. 3A shows the length, $L_R$, of the recess. Imparting cylindrical relief 28 to shaft 14 forms a recessed shaft $14_R$ and establishes a transition portion 30 between a tapered work end 32 and recessed shaft $14_R$. Tapered work end 32 includes tip 16 and is of the same dimensions as those of the corresponding portion of the work end of prior art twist drill 10. The flute edges extending along the length, $L_R$, are, of course, not sharpened because of the relief from the hole wall.

With particular reference to FIGS. 3B and 3D, the unmodified portion of leading cutting edge 24 of each flute 20 is in the form of an angularly inclined cutting edge 34 and a transition portion cutting edge 36. Inclined cutting edge 34 extends from tip 16 to a termination point 38 at transition portion 30, and transition portion cutting edge 36 follows the spiral direction of flute 20 and is substantially concentric with longitudinal axis 12. Inclined cutting edge 34 is the standard leading sharpened flute edge for conventional plunge operation. FIG. 3D shows cylindrical relief 28 forming a 90 degree relief angle relative to transition portion cutting edge 36; however, other relief angles would be suitable. The radial distance between termination point 38 and longitudinal axis 12 sets the twist drill diameter. FIGS. 3A, 3B, 3C, and 3D show a first embodiment of the invention in which the twist drill requires less energy to drill a hole. The 0.1D recess depth and 0.4D transition portion length dimensions preferably apply to a twist drill diameter of ⅜ inch (953 millimeter) or smaller. A twist drill diameter of greater than ⅜ inch (953 millimeter) can be modified with the dimensions established for a ⅜ inch (953 millimeter) diameter drill.

FIGS. 4A, 4B, and 4C show that a second modification process step entails providing back relief 48 of preferably about 60 degrees following the cylindrical contour of the shaft as shown. FIG. 4D, which is a 5:1 enlarged view of the work end shown in FIG. 4A, together with FIG. 5D, shows the back relief angle of 60 degrees and features it creates to enable lateral cutting movement during twist drill extraction from a work piece. In particular, back relief 48 forms a leading edge tooth 50 that enables cutting during extraction of the twist drill rotating in either a clockwise or counter-clockwise direction. Back relief 48 also provides the space required for removal of work piece material cut as the drill bit rotates in a counter-clockwise (reverse) direction during extraction. FIGS. 4A, 4B, 4C, and 4D show a second embodiment of the invention in which the twist drill enables lateral cutting during extraction from a drilled hole in a work piece.

Leading edge tooth 50 is positioned at the bottom of transition portion cutting edge 36. A shallow back relief area 52 of triangular shape beginning at a relief line 54 extends rearwardly from transition portion cutting edge 36.

FIGS. 5A, 5B, and 5C show that a third, optional modification process step entails providing, such as by grinding, top relief at a compound angle of preferably about 25 degrees in z-axis, 30 degrees in y-axis, and 15 degrees in x-axis, as measured from the coordinate axes shown in FIG. 5C. FIG. 5D, which is a 5:1 enlarged view of the work end shown in FIG. 5B, shows a top relief region 58 of crescent shape that provides relief for transition portion cutting edge 36 that determines the hole diameter. FIG. 5E shows a plan view of the work end. FIGS. 5A, 5B, 5C, 5D, and 5E show in final form the twist drill implemented with both embodiments of the present invention.

The twist drill resulting from implementation of the three modification process steps described above provides the following advantages. Cylindrical relief 28 results in less drill shank contact with the work piece, and thereby reduces heat generated during cutting and provides a consequent longer life of the sharpened cutting edge. There is also an increase in battery life for cordless drill power heads. Back relief 48 following the cylindrical contour of the shaft allows for removal of debris in a freshly cut hole and lateral movement with cutting in either rotational direction of the twist drill during its extraction from the work piece.

Skilled persons will appreciate that the work end need not be restricted to a point but can alternatively be, for example, a spade bit end, a three-point end, or any other conventional drill bit work end.

The construction of the relieved reversible twist drill has been described with reference to the practice of a three-step modification process on a conventional twist drill. Skilled persons will appreciate that the drill bit of the present invention can be manufactured in accordance with a more extensive process starting with metal stock that does not embody features of a conventional twist drill.

It will be obvious to those having skill in the art that many changes may be made to the details of the above-described embodiments of this invention without departing from the underlying principles thereof. The scope of the invention should, therefore, be determined only by the following claims.

The invention claimed is:

1. In a drill bit including an elongate body along which a longitudinal axis extends and in which multiple interlaced spiral flutes are formed about the longitudinal axis, the body including a shaft having a length and terminating between a tapered end and a shank, the tapered end having an apex at which a tip is formed and through which the longitudinal axis passes, the improvement comprising:
   the shaft provided with relief in the form of a depthwise recess along the length of the shaft between the tapered end and the shank, the recess establishing a transition portion between the tapered end and the shank;
   first and second inclined cutting edges angularly spaced apart about the longitudinal axis and converging at the tip of the tapered end, the first and second cutting edges angularly inclined from the tip in directions away from the longitudinal axis and terminating at the transition portion to define a wall diameter of a hole cut by the drill bit in a work piece; and
   first and second leading edge teeth formed by cylindrical and back relief provided at transition portion locations associated with the respective first and second inclined cutting edges, the first and second leading edge cutting teeth clearing from the hole previously cut work piece material debris upon extraction of the drill bit from the hole, irrespective of the direction of rotation of the drill bit, and the transition portion including first and second transition portion cutting edges of different ones of the spiral flutes, the first and second transition portion cutting edges positioned a radial distance from the longitudinal axis to set a diameter for the twist drill.

2. The drill bit of claim 1, in which the relief in the form of a depthwise recess forms a relief angle of about 90 degrees relative to each of the first and second transition portion cutting edges.

3. The drill bit of claim 1, further comprising a top relief region in the tapered end to create clearance for work piece material cut during drill bit operation.

4. The drill bit of claim 2, in which the multiple spiral flutes have flute edges, and the flute edges of flute portions on the shaft are unsharpened.

5. The drill bit of claim 1, in which the transition portion has a bottom located adjacent the shaft and the leading edge cutting tooth is positioned at the bottom of the transition portion.

6. The drill bit of claim 2, further comprising back relief formed in the transition portion to establish the leading edge tooth.

7. The drill bit of claim 6, in which the shaft has a cylindrical contour and the back relief follows the cylindrical contour of the shaft.

8. The drill bit of claim 2, in which the transition portion has a bottom located adjacent the shaft and the leading edge cutting tooth is positioned at the bottom of the transition portion.

9. The drill bit of claim 2, further comprising a top relief region in the tapered end to create clearance for work piece material cut during drill bit operation.

10. The drill bit of claim 1, in which the multiple spiral flutes have flute edges, and the flute edges of flute portions on the shaft are unsharpened.

11. The drill bit of claim 1, further comprising back relief formed in the transition portion to establish the leading edge tooth.

12. The drill bit of claim 11, in which the shaft has a cylindrical contour and the back relief follows the cylindrical contour of the shaft.

* * * * *